United States Patent [19]

Heiss et al.

[11] E Re. 30,721

[45] Reissued Aug. 25, 1981

[54] STABILIZED THERMOPLASTIC POLYESTERURETHANES

[75] Inventors: Herbert L. Heiss, New Martinsville; Robert P. Yeater, Moundsville; Russell P. Carter, Jr., New Martinsville, all of W. Va.

[73] Assignee: Mobay Chemical Corporation, Pittsburgh, Pa.

[21] Appl. No.: 156,952

[22] Filed: Jun. 6, 1980

Related U.S. Patent Documents

Reissue of:

[64] Patent No.: 4,123,419
Issued: Oct. 31, 1978
Appl. No.: 828,120
Filed: Aug. 26, 1977

[51] Int. Cl.[3] ..... C08K 5/35; C08G 18/82

[52] U.S. Cl. ..... 260/45.8 NZ; 528/53; 548/229; 525/6

[58] Field of Search ..... 260/45.8 NZ

[56] References Cited

U.S. PATENT DOCUMENTS

| | | | |
|---|---|---|---|
| 2,885,420 | 5/1959 | Spiegler | 260/77.5 SS |
| 3,020,262 | 2/1962 | Speranza | 260/77.5 R |
| 3,334,110 | 8/1967 | Schramm | 260/77.5 R |
| 3,471,442 | 10/1969 | DiLeone | 260/77.5 R |
| 3,781,229 | 12/1973 | Smith et al. | 260/77.5 R |
| 3,817,938 | 6/1974 | Ashida et al. | 260/77.5 R |
| 3,905,945 | 9/1975 | Iseda et al. | 260/77.5 R |
| 4,022,721 | 5/1977 | Ashida | 260/77.5 R |

FOREIGN PATENT DOCUMENTS

| | | |
|---|---|---|
| 4420247 | 3/1967 | Japan . |
| 1453694 | 10/1976 | United Kingdom . |

OTHER PUBLICATIONS

Elderfield, Heterocyclic Compounds (1957), pp. 396–402, vol. 5.

*Primary Examiner*—H. S. Cockeram
*Attorney, Agent, or Firm*—Gene Harsh; Joseph C. Gil

[57] ABSTRACT

The instant invention is directed to novel color and hydrolytically stable thermoplastic polyester urethanes. The invention broadly consists of adding 2-oxazolidones to the components of the polyurethane, or to the polyurethane itself.

4 Claims, No Drawings

STABILIZED THERMOPLASTIC POLYESTERURETHANES

Matter enclosed in heavy brackets [ ] appears in the original patent but forms no part of this reissue specification; matter printed in italics indicates the additions made by reissue.

BACKGROUND OF THE INVENTION

One of the more serious problems confronting a manufacturer of polyesterurethanes and manufacturers of parts prepared from polyesterurethanes is that degradation takes place over a period of time when conditions are such that hydrolysis can result. This degradation generally occurs at the ester linkage. Various techniques have been utilized in order to improve the stability of polyesters against hydrolysis. One such technique is to incorporate into the polyester either chemically or mechanically, compounds such as carbodiimide, alkylene carbonates, silicones and 2-imino-oxazolidines (see, e.g., U.S. Pat. Nos. 3,401,144 and 3,770,693).

Additionally, since many thermoplastic polyurethanes based on polyesters will ultimately discolor, only mild interest has been displayed in the past in providing products with low initial color. Whenever possible, care was taken to minimize color of the reactants, but to date, the thermoplastic polyesterurethanes themselves have not been assigned any color specifications. Recently, there has developed a market for colorless, transparent roller skate wheels molded from thermoplastic polyurethanes. The specific type of discoloration involved is that which occurred during exposure of the thermoplastic polyesterurethane to processing temperatures experienced during drying, extrusion or molding. The yellowing of the polymer did not seem to be associated with any significant change in strength properties and was entirely different from the discoloration which occurs during the service life of the ultimate product (i.e., weathering). It was found that this discoloration could occur during pelletization extrusion, resulting in the shipment of pellets which varied in color. It was also found that some lots of polymer discolored even more during the final product processing with the result that the final product also varied in color.

DESCRIPTION OF THE INVENTION

It has now been found that the hydrolytic stability and discoloration problems noted above can be substantially eliminated by adding to the thermoplastic polyurethanes before, during or after the polymer-forming reaction, small amounts of 2-oxazolidones. Additionally, and quite unexpectedly, the oxazolidones described herein, when added to the thermoplastic polyurethane are effective color stabilizers.

The preferred 2-oxazolidones are generally known and correspond to the formula:

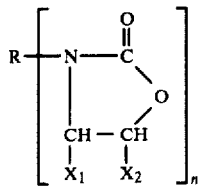

where R represents hydrogen or an organic radical which is free of epoxide reactable groups, such as an aliphatic, aromatic, mixed aliphatic-aromatic, or an organic polymer radical; $X_1$ and $X_2$ may be the same or different and represent hydrogen or organic radicals which are free of epoxide reactive groups; and n represents an integer of 1 to 3. As is known in the art, these oxazolidones may be produced in a number of ways, e.g. (a) by reacting an organic isocyanate with an epoxide, (b) by reacting the corresponding isocyanate dimer with an epoxide, or (c) by reacting an organic isocyanate with an alkylene carbonate. It is generally preferred that R, $X_1$ and $X_2$ each represent a hydrogen atom or a radical selected from the group consisting of alkyl and cycloalkyl of from 1 to 12 carbon atoms and aryl, aralkyl and alkaryl of from 6 to 15 carbon atoms and n represents an integer of from 1 to 3. It is preferable that $X_1$ and $X_2$ each represent hydrogen. In addition to hydrogen, R can preferably represent, e.g., one of the following: methyl, ethyl, propyl, isopropyl, cyclohexyl, phenyl, tolyl biphenyl and the like. It is presently most preferred that when n=1, R represents H,

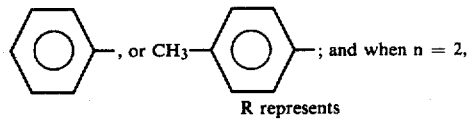

R represents

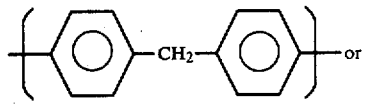

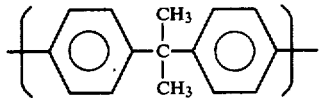

As noted above, the 2-oxazolidones useful in the instant invention are generally known and have been described, e.g., in U.S. Pat. Nos. 2,977,369; 2,977,370; 2,977,371; and 4,022,721, and in "HETEROCYCLIC COMPOUNDS", VOLUME 5, "Five-Membered Heterocycles Containing Two Hetero Atoms and Their Benzo-Derivatives", edited by Robert C. Elderfield, 1957, pages 396 through 402, the disclosures of which are herein incorporated by reference.

The oxazolidones should be added to the thermoplastic polyurethanes in amounts effective to stabilize the polyurethane and preferably in amounts ranging from 0.02 to 6 percent by weight based on the total weight of the polyurethane. It has been surprisingly found that when these amounts are used, in addition to improved stability against processing discoloration, the polyurethanes exhibit greatly improved hydrolytic stability.

In practicing the invention, the oxazolidone can be added to the polyester, the organic isocyanate or other reactant used in the preparation of the polyesterurethane, such as, a chain extender, or it may be added to the polyesterurethane product. Addition to the product itself is generally most practical. The addition can be made in the dissolved state, by extruding, milling, stirring or any suitable technique.

In the preparation of polyesterurethanes, any suitable polyester may be used, such as those prepared from polycarboxylic acids and polyhydric alcohols. Any suitable polycarboxylic acid may be used such as, for example, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaonic acid and the like.

Any suitable polyhydric alcohol may be used as, for example, ethylene glycol, propylene glycol, 1,4-butanediol, 1,3-butanediol, 1,5-pentanediol, 1,6-hexanediol, bis-(hydroxy methyl chlorohexane), diethylene glycol, 2,2-dimethyl propylene glycol, 1,3,6-hexanetriol, trimethylol propane, pentaerythritol, sorbitol, glycerine and the like. Also, suitable as polyesters in the preparation of polyesterurethanes are those prepared from lactams, lactones, polyesteramides, and the like.

In the preparation of polyesteramides, an amine is included in the reaction of a carboxylic acid and an alcohol, aminoalcohol or aminoacid can be used. Any suitable amino compound can be used to prepare polyesteramides such as, for example, hexamethylene diamine, ethylene diamine, propylene diamine, butylene diamine, cyclohexyl diamine, phenylene diamine, tolylene diamine, xylylene diamine, 4,4'-diaminodiphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components or sequentially therewith.

Any suitable polyisocyanate can be used in the preparation of polyesterurethanes by reaction with a polyester such as, tetramethylene diisocyanate, hexamethylene, diisocyanate, 1,4-phenylene diisocyanate, 1,3-phenylene diisocyanate, 1,4-cyclohexylene diisocyanate, 2,4-tolylene diisocyanate, 2,5-tolylene diisocyanate, 2,6-tolylene diisocyanate, 3,5-tolylene diisocyanate, 4-chloro-1,3-phenylene diisocyanate, 1-methoxy-2,4-phenylene diisocyanate, 1-methyl-3,5-diethyl-2,6-phenylene diisocyanate, 1,3,5-triethyl-2,4-phenylene diisocyanate, 1-methyl-3,5-diethyl-2,4-phenylene diisocyanate, 1-,ethyl-3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3-dimethyl-4,6-bis(beta-isocyanato-ethyl) benzene, 3-(alphaisocyanatoethyl) phenylisocyanate, 1-methyl-2,4-cyclohexylene diisocyanate, 4,4'-biphenylene diisocyanate, 3,3'-dimethyl-4,4'-biphenylene diisocyanate, 3,3'-dimethoxy-4,4'-biphenylene diisocyanate, 3,3'-diethoxy-4,4'-biphenylene diisocyanate, 1,1'-bis-(4-isocyanatophenyl) cyclohexane, 4,4'-diisocyanatodiphenylmethane, 4,4'-diisocyanato-3,3'-dimetyldiphenylmethane, 4,4'-diisocyanato-3,3'-dichlorodiphenylmethane, 4,4'-diisocyanatodiphenyl-dimethylmethane, 1,5-naphthylene diisocyanate, 1,4-naphthylene diisocyanate, 2,4,4'-triisocyanatodiphenylether, 2,4,6-triisocyanato-1-methyl-3,5,-diethylbenzene, and the like.

The invention is particularly applicable to the stabilization of polyesterurethanes used in the manufacture of elastomers or casting resins for molded elements.

In the preparation of polyesterurethanes in accordance with the invention, any of the above-mentioned polyesters may be reacted with any of the isocyanates set forth and a chain extending agent containing active hydrogen atoms which are reactive with NCO groups and having a molecular weight less than about 500 such as, for example, water, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(b-hydroxy ethyl ether), 1,3-phenylene-bis-(b-hydroxy ethyl ether), bis-(hydroxy methylcyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-metylene-bis(2-chloraniline), 3,3-dichloro-4,4'-biphenyl diamine, 2,6-diamino pyridine, 4,4'-diamino diphenyl methane, and the like, alkanol amines such as, for example, ethanol amine, aminopropyl alcohol, 2,2-dimethyl propanyl amine, 3-amino cyclohexyl alcohol, p-amino benzyl alcohol and the like; water hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazine, thiopropionic acid dihydrazide, tartaric acid dihydrazide, 1,3-phenylene-disulfonic acid dihydrazide, omega-amino-capronic acid dihydrazide, gamma-hydroxybutyric hydrazide, bis-semicarbazide, bis-hydrazine carbonic esters of glycols such as many of the glycols heretofore mentioned and the like.

The following Examples illustrate the present invention.

Unless otherwise specified, all figures are to be understood as parts or percentages by weight.

EXAMPLES 1 THROUGH 6

About 1,000 parts of a polyester polyol (prepared from 1,4-butanediol and adipic acid having a molecular weight of about 2,000 and a hydroxyl number of 56) were reacted with about 410 parts of methylene (bis-phenylisocyanate) and about 100 parts by weight of 1,4-butane diol, by mixing the ingredients and curing in an oven for 30 minutes at 100° C. The resulting slab was then granulated.

The oxazolidones specified in the Table were added to the granulates in the amounts specified based on the weight of the product. The resultant mixture was divided into two portions, one was strand pelletized and one was injection molded into slabs.

The pellets were placed in ovens and heated for 16 hours at 110° C. to develop color, after which they were rated for color stability on a scale of 1 to 10, 1 being colorless and 10 being most discolored.

The molded portions were aged at 100% relative humidity at 100° C. for 2 days to cause hydrolytic decomposition, after which they were dried and tested. The percent tensile strength retained compared to the original value was used to measure the hydrolytic stability.

The results were as set forth in the Table.

| Example | % By Weight | Color | Hydrolytic |
|---|---|---|---|

-continued

| Number | Oxazolidone Added | Added | Stability | Stability |
|---|---|---|---|---|
| 1 | None | — | 10 | 30 |
| 2 a | 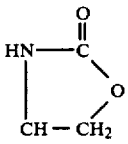 | 0.05 | 8 | 30 |
| b | " | 0.1 | 6 | 37 |
| c | " | 0.5 | 6 | 42 |
| d | " | 1.0 | 8 | 42 |
| 3 a | 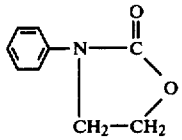 | 1.0 | 10 | 45 |
| b | " | 1.0 | 9 | |
| c | " | 2.0 | 10 | 45 |
| 4 a | 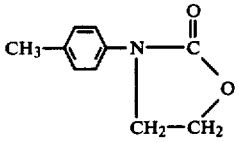 | 1.0 | 6 | 36 |
| b | " | 1.0 | 9 | |
| 5 a(1) | 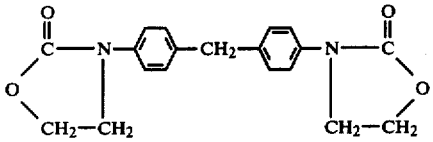 | 1.0 | 2 | 50 |
| b | " | 1.0 | 8 | |
| c | " | 2.0 | 4 | 56 |
| d | " | 2.0 | 5 | 44 |
| e | " | 5.0 | 5 | 45 |
| f | " | 1.17 | 8 | 38 |
| g | " | 1.0 | 10 | 41 |
| h | " | 1.0 | 9 | |
| 6 a | 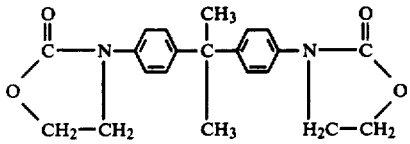 | 1.0 | 10 | 47 |
| b | " | 1.0 | 8 | |

(1)Note:
MP 200–212° C. in a, b, c
204–216 in d, e
214–219 in f
220–221 in g, h

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

[1. A polyesterurethane stabilized against hydrolysis and/or processing discoloration by having incorporated therein a stabilizing amount of a 2-oxazolidone.]

[2. The stabilized polyesterurethane of claim 1 wherein the 2-oxazolidone has the formula

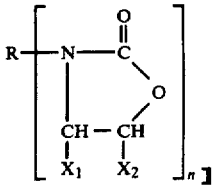

wherein R represents hydrogen or an organic radical which is free of epoxide reactable groups, $X_1$ and $X_2$ may be the same or different and represent hydrogen or organic radicals which are free of epoxide reactable groups, and n represents an integer of from 1 to 3.]

[3. The stabilized polyesterurethane of claim 2 wherein R, $X_1$ and $X_2$ may be the same or different and represent a hydrogen atom or a radical selected from the group consisting of alkyl and cycloalkyl of from 1 to 12 carbon atoms and aryl, aralkyl and alkaryl of from 6 to 15 carbon atoms.]

[4. The stabilized polyesterurethane of claim 3 wherein $X_1$ and $X_2$ represent hydrogen.]

[5. The stabilized polyesterurethane of claim 4 wherein n=1.]

[6. The stabilized polyesterurethane of claim 5 wherein R is selected from the group consisting of hydrogen,

[

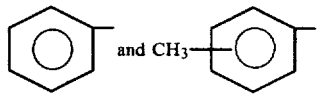

]

[7. The stabilized polyesterurethane of claim 4 wherein n=2.]

[8. The stabilized polyesterurethane of claim 7 wherein R is selected from the group consisting of

[

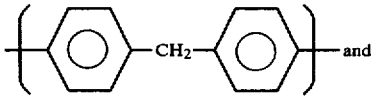

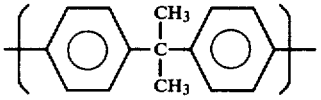

]

[9. The stabilized polyesterurethane of claim 1 wherein the 2-oxazolidone is present in an amount of from 0.02 to 6 percent by weight based on the weight of the polyesterurethane.]

*10. A polyesterurethane stabilized against hydrolysis and/or processing discoloration by the addition of a stabilizing amount of a 2-oxazolidone-based compound of the formula:*

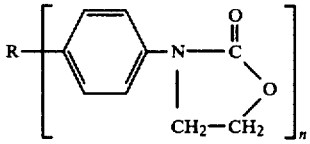

*wherein R represents hydrogen or an organic radical which is free of epoxide reactable groups and n represents an integer of from 1 to 3.*

*11. The stabilized polyesterurethane of claim 10, wherein R is hydrogen or $CH_3$— and n is 1.*

*12. The stabilized polyesterurethane of claim 10, wherein R is —$CH_2$— or*

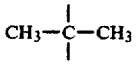

*and n is 2.*

*13. The stabilized polyesterurethane of claim 10, wherein said 2-oxazolidone-based compound is present in an amount of from 0.02 to 6% by weight based on the weight of the polyesterurethane.*

* * * * *